(12) United States Patent
Moloney

(10) Patent No.: US 9,104,633 B2
(45) Date of Patent: Aug. 11, 2015

(54) HARDWARE FOR PERFORMING ARITHMETIC OPERATIONS

(75) Inventor: David Moloney, Dublin 1 (IE)

(73) Assignee: LINEAR ALGEBRA TECHNOLOGIES LIMITED, Dublin (IR)

(*) Notice: Subject to any disclaimer, the term of this patent is extended or adjusted under 35 U.S.C. 154(b) by 281 days.

(21) Appl. No.: 13/521,178

(22) PCT Filed: Jan. 7, 2011

(86) PCT No.: PCT/EP2011/050189
§ 371 (c)(1),
(2), (4) Date: Oct. 11, 2012

(87) PCT Pub. No.: WO2011/083152
PCT Pub. Date: Jul. 14, 2011

(65) Prior Publication Data
US 2013/0073599 A1 Mar. 21, 2013

(30) Foreign Application Priority Data
Jan. 7, 2010 (GB) .................................. 1000197.2

(51) Int. Cl.
G06F 17/16 (2006.01)
G06F 9/30 (2006.01)

(52) U.S. Cl.
CPC .............. *G06F 17/16* (2013.01); *G06F 9/3001* (2013.01)

(58) Field of Classification Search
None
See application file for complete search history.

(56) References Cited

U.S. PATENT DOCUMENTS 3,919,534 A    11/1975  Hutson
5,517,628 A *  5/1996   Morrison et al. ............. 712/234

FOREIGN PATENT DOCUMENTS

WO    WO 2009/101119 A1    8/2009

OTHER PUBLICATIONS

International Preliminary Report on Patentability for PCT/EP2011/050189 mailed Jul. 19, 2012.

* cited by examiner

*Primary Examiner* — Michael D Yaary
(74) *Attorney, Agent, or Firm* — Marsh Fischmann & Breygogle LLP; Kent A. Lembke

(57) ABSTRACT

Hardware for performing sequences of arithmetic operations. The hardware comprises a scheduler operable to generate a schedule of instructions from a bitmap denoting whether an entry in a matrix is zero or not. An arithmetic circuit is provided which is configured to perform arithmetic operations on the matrix in accordance with the schedule.

60 Claims, 10 Drawing Sheets

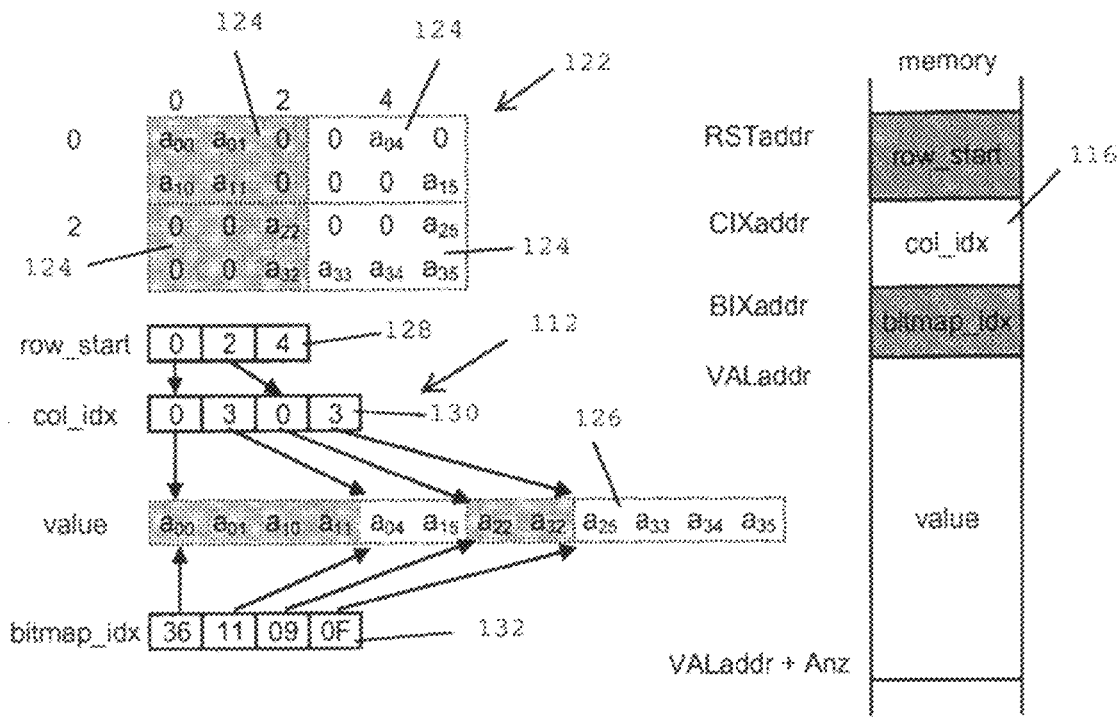

FIGURE 5

| Address | Name | Type | b[31-4] | b3 | b2 | b1 | b0 |
|---|---|---|---|---|---|---|---|
| 0x0000 | command | Read/Write | reserved | stop | resume | pause | start |
| 0x0001 | BM | Read/Write | 32-bit integer | | | | |
| 0x0002 | Arows | Read/Write | 32-bit integer | | | | |
| 0x0003 | Acols | Read/Write | 32-bit integer | | | | |
| 0x0004 | Anz | Read/Write | 32-bit integer | | | | |
| 0x0005 | Brows | Read/Write | 32-bit integer | | | | |
| 0x0006 | Bcols | Read/Write | 32-bit integer | | | | |
| 0x0007 | RSTaddr | Read/Write | 32-bit address | | | | |
| 0x0008 | CIXaddr | Read/Write | 32-bit address | | | | |
| 0x0009 | BIXaddr | Read/Write | 32-bit address | | | | |
| 0x000A | VALaddr | Read/Write | 32-bit address | | | | |
| 0x000B | NZcount | Read Only | 32-bit counter | | | | |
| 0x000C | CYCcount | Read Only | 32-bit counter | | | | |

FIGURE 6

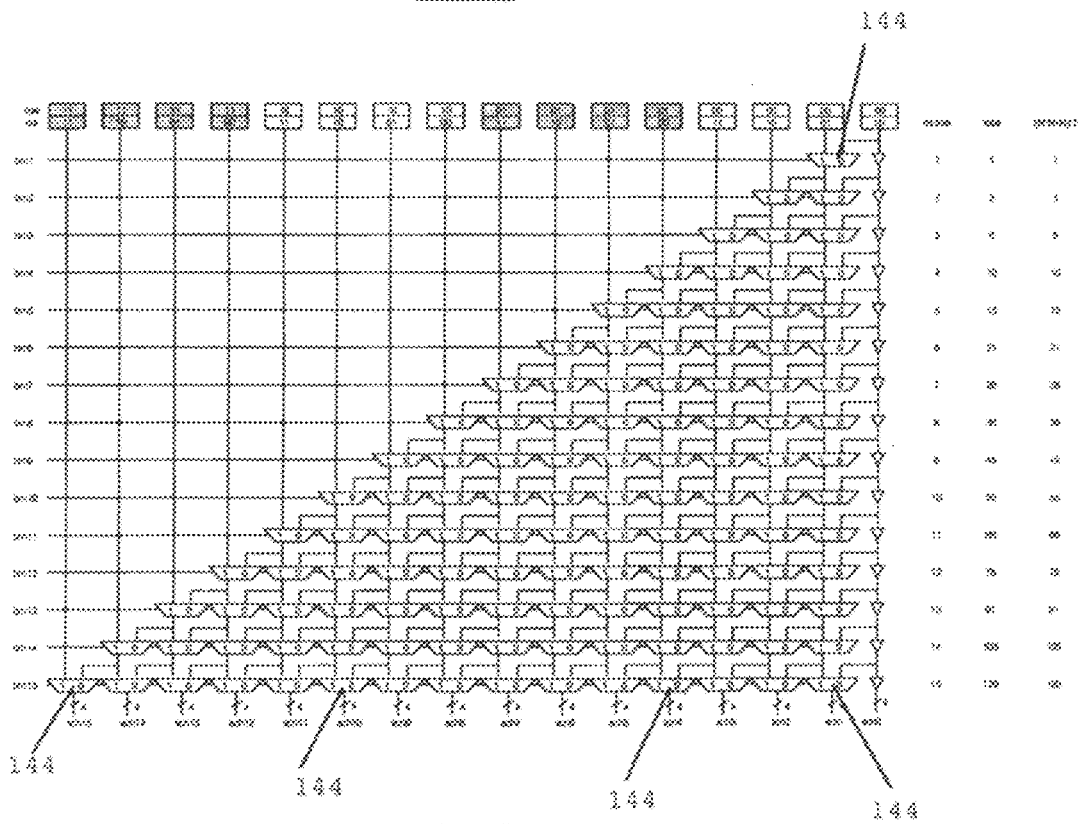

|   | bitmap1 0x0F00 |   |   |   |
|---|---|---|---|---|
| 0 | 0 | 0 | 0 | 0 |
| 1 | 1 | 1 | 1 | 1 |
| 2 | 0 | 0 | 0 | 0 |
| 3 | 0 | 0 | 0 | 0 |
|   | 0 | 1 | 2 | 3 |

| bitmap2 0x5448 |   |   |   |
|---|---|---|---|
| 0 | 1 | 0 | 1 |
| 0 | 1 | 0 | 0 |
| 0 | 1 | 0 | 0 |
| 1 | 0 | 0 | 0 | independent scheduling

| sch (bm1) | col | 0 | 1 | 2 | 3 |   |   |   |   |   |
|---|---|---|---|---|---|---|---|---|---|---|
|           | row | 1 | 1 | 1 | 1 |   |   |   |   |   |
| sch (bm2) | col |   |   |   |   |   | 0 | 1 | 1 | 3 |
|           | row |   |   |   |   |   | 3 | 0 | 1 | 2 | 0 | lookahead scheduling

| sch (bm1) | col | 0 |   | 1 |   | 2 |   | 3 |   |   |
|---|---|---|---|---|---|---|---|---|---|---|
|           | row | 1 |   | 1 |   | 1 |   | 1 |   |   |
| sch (bm2) | col |   | 0 |   | 1 |   | 1 |   | 3 | 1 |
|           | row |   | 3 |   | 0 |   | 2 |   | 0 | 1 |

FIGURE 13

HARDWARE FOR PERFORMING ARITHMETIC OPERATIONS

RELATED APPLICATIONS

This application is a national phase of PCT Application No. PCT/EP2011/050189 filed on Jan. 7, 2011, entitled "Hardware for Performing Arithmetic Operations," which claims prior from GB Application No. 1000197.2, filed on Jan. 7, 2010, both of which are hereby incorporated by reference into this application in their entirety

FIELD

The present invention relates to hardware for performing repetitive arithmetic or logical operations on data-structures. The invention more particularly relates to hardware which includes a scheduler operable to generate a schedule of instructions and associated address references from a bitmap denoting whether an entry in a matrix is zero or not, and an arithmetic circuit configured to perform arithmetic operations on the matrix using non-zero values in accordance with the schedule.

BACKGROUND

There is a fundamental problem in the design of computing systems, namely that of minimising the time cost of memory accesses.

This is a fundamental limitation on the design of computer systems as no matter what memory technology is used to support computation and no matter what technology is used to connect that memory to the processor, there is a maximum limitation on how much information can be transferred between processor and memory in a given time, this is the available memory bandwidth and the limitation of computer power by available memory bandwidth is often referred to as the "memory-wall".

It is known to employ data compression to reduce the effects of the "memory wall". However, a problem for programmers using compressed memory sub-systems is that data has to be decompressed before it can be operated upon as shown in the system of FIG. 1. This usually involves reading the compressed data from one part of memory into the register files 14 of the processor 16, decompressing it using program code retrieved from program memory 18 and storing the decompressed data in another uncompressed portion of memory 12.

However this solution has the disadvantage that additional memory bandwidth is required to read compressed data, store it in uncompressed form, and read it back into the processor to be operated upon. Additional memory capacity is also required to hold the uncompressed data and the decompression process will increase pressure on the processors registerfiles. Clearly this is a sub-optimal solution which it is suggested explains why such compressed memory sub-systems have remained an academic curiosity rather than entering the mainstream microprocessor industry.

Register-blocking is a useful technique for accelerating matrix algebra (particularly Finite-Element), however it has the disadvantage in that for many matrices (ex. As used in search engines such as GOOGLE™) zero fill has to be added decreasing effective FLOPS, and increasing memory bandwidth requirements, both of which are commodities which are in short supply in modern computing systems.

In fact the growing gap between processing capabilities and memory bandwidth which are increasing at highly disparate rates of 50% and 7% per annum respectively is referred to, as mentioned above, as the "Memory Wall". There have been many claims of "breaking" the memory wall and they usually consist of using a cache to reduce the probability of having to go off-chip, and/or using multi-threading so that the latency and penalties associated with going off-chip can be mitigated.

These approaches merely hide the problem of limited external memory bandwidth rather than solving it and generally rely on the data-set exhibiting sufficient data locality, and the program exhibiting sufficient Thread-Level Parallelism (TLP) in order to be effective at all. In fact many of the larger and more interesting problems exhibit neither sufficient data-locality, nor sufficient TLP and the throughput of the whole system degenerates to the point where it is limited by external memory bandwidth, and the extra hardware which has been added on-chip is of no use. For this reason it is not uncommon to see large engineering applications pulling down processor performance to 1% or less of the manufacturers quoted peak performance specification.

State of the art methods for computing Sparse-Matrix Vector Products (SMVM) have improved little over the past few decades and performance improvements have been driven largely by advances in processor and semiconductor process technology. In general SMVM has had little if any influence on the design of mainstream microprocessors despite the obvious problems in terms of scaling I/O bandwidth performance, particularly where Chip Multi-Processors (CMPs) exacerbate problems by contending for increasingly scarce I/O bandwidth. A sizeable number of the entries in typical blocked sparse-matrices consist of zero fill. These values even if they do not contribute to the result of an SMVM are nonetheless fetched from memory and multiplied with all of the attendant problems in terms of power-dissipation and system throughput.

FIG. 2 is an exemplary illustration of a state of the art Block Compressed Sparse Row (BCSR) data-structure which consists of 3 arrays. The row (row_start) array holds the row entries containing non-zero tiles, a second col (col_idx) array containing the column addresses of the non-zero tiles and a val (value) array containing the actual non-zero entries (with fill) for all of the non-zeroes in the sparse-matrix, arranged in tile-by-tile order. If the A-matrix entry is zero then a processor will unnecessary perform computations using zero values leading to unnecessary consumption of bandwidth and power.

Many of the computations performed by processors consist of a large number of simple operations. As a result, a multiplication operation may take a significant number of clock cycles to complete. Whilst this operation is justified for complex calculations, the same cannot be said of trivial operations, for example multiplication of one number by 0, +1, or −1, where the answer may be obtained in a much simpler fashion.

JP 60247782 discloses an arrangement in which a sparse matrix is loaded and then examined to identify trivial values within the matrix. This approach however does not address the limitation in having to load the complete matrix from memory. JP 61025275 discloses a processor which interrogates values within a matrix to reduce the time required for a matrix operation. Similarly, JP 58022446 discloses a processor in which arithmetic operations are avoided depending on values contained within a register. JP 58109971 examines values within a register to reduce the overall computation time within a pipeline processor architecture for a calculation when an intermediate value generated during a computation is a trivial value. Similarly, GB 1479404 discloses an arrangement in which data values within a matrix are examined to determine if they contain trivial values and where this determination is used in the performance of a computation. All of these approaches still involve the loading of the complete matrices from memory.

In certain applications, involving sparse matrices, the number of trivial operations carried out can be very significant owing to the presence of a significant number of zeros. The number of zeroes in a sparse matrix can be reduced or eliminated by storing the matrix in a sparse format such as compressed Row Storage (CRS) format, however due to the overheads in terms of address-generation such storage formats often result in very poor performance on commercial computer systems.

There is therefore a need for a solution which addresses at least some of the drawbacks of the prior art.

SUMMARY

These and other problems are addressed by providing hardware for performing arithmetic operations, the hardware includes a scheduler operable to generate a schedule of instructions and associated addresses (array references) from a bitmap denoting whether an entry in a matrix is zero or not, and an arithmetic circuit configured to perform arithmetic operations on the matrix using non-zero values in accordance with the schedule.

The hardware avoids the need to perform trivial operations due to zero fill-in values contained in the matrix. The need to perform operations such as storing or loading zero fill-in values to memory, moving them via shared busses or indeed performing arithmetic operations using these zero fill-in values is eliminated.

Accordingly, a first embodiment of the application provides hardware as detailed in claim 1. The application also provides a hardware assembly as detailed in claim 50. Furthermore, the application relates a method as detailed in claim 55. Additionally, the application provides a method as detailed in claim 56. Advantageous embodiments are provided in the dependent claims.

These and other features will be better understood with reference to the followings Figures which are provided to assist in an understanding of the teaching of the invention.

BRIEF DESCRIPTION OF THE DRAWINGS

The present application will now be described with reference to the accompanying drawings in which:

FIG. 5 is an illustration of a bitmap block compressed sparse row (BBCSR) data structure used by the hardware of FIG. 3.

FIG. 6 is an illustration of the control registers of the hardware of FIG. 3.

FIG. 7 is an exemplary bit map for compressing the schedule.

FIG. 8 is a schematic circuit diagram of a component of the hardware of FIG. 3.

FIG. 13 is an exemplary scheduling arrangement implemented by the hardware of FIG. 3.

DETAILED DESCRIPTION OF THE DRAWINGS

The invention will now be described with reference to exemplary hardware which is provided to assist in an understanding of the teaching of the invention.

Figure 3:
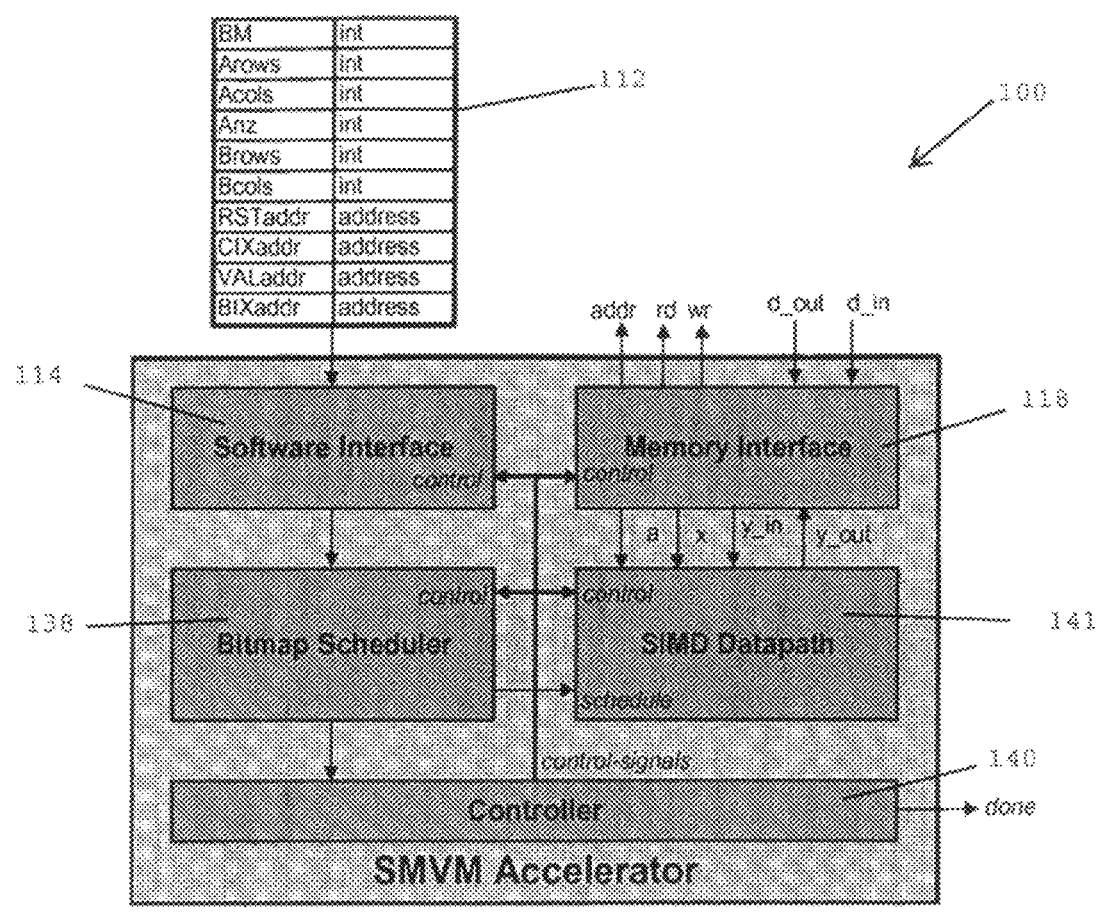
FIG. 3 is a block diagram of hardware according to an embodiment of this application.
Figure 4:
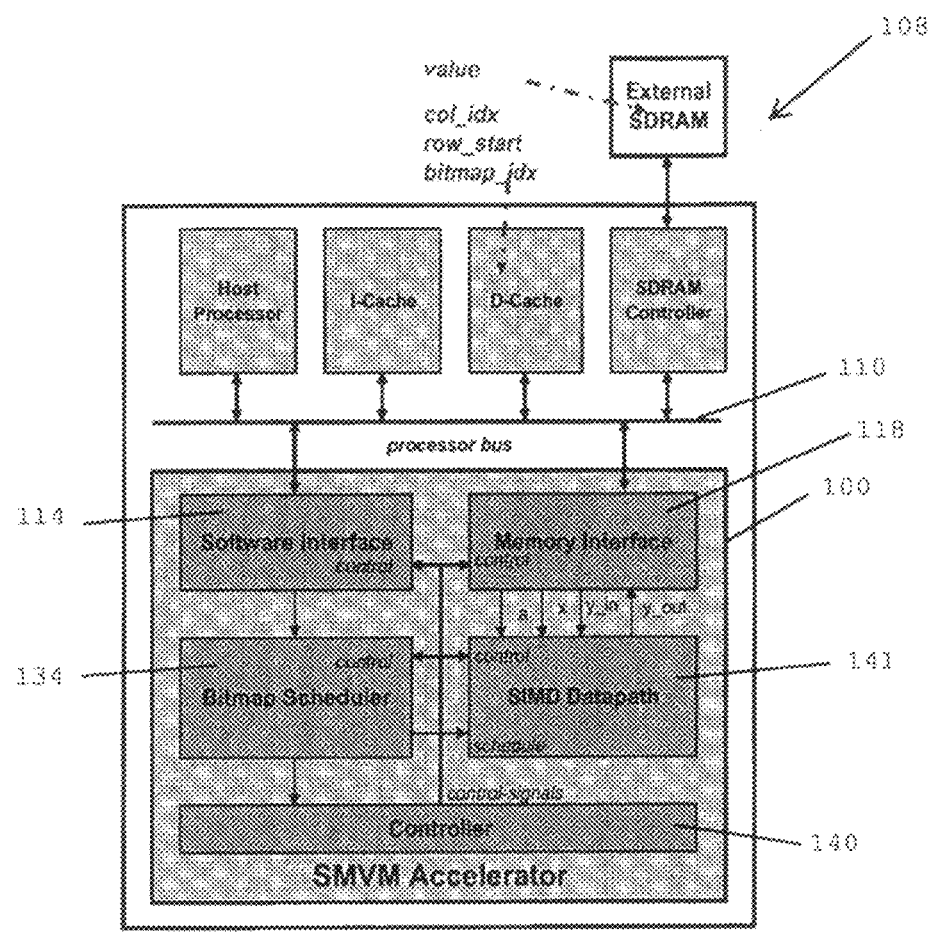
FIG. 4 is a block diagram of a hardware assembly comprising the hardware of FIG. 3 and other hardware components.

Referring to the drawings and initially to FIGS. 3 and 4 there is provided hardware 100 for performing arithmetic operations. The hardware 100 is designed to avoid performing operations on zero entries when processing matrices. The need to perform operations such as storing or loading zero value to memory, moving them via shared busses or indeed performing arithmetic operations using zero value is avoided. The hardware assembly 108 of FIG. 4 includes the hardware 100 operably coupled to external hardware components via a processor bus 110. The processor bus 110 allows data to be communicated between the hardware 100 and the external hardware components which may include for example, a processor, cache, an SDRAM controller, SDRAM etc.

One of the key uses of sparse data-structures in computer science and engineering applications is the storage of sparse matrices and the key application of sparse matrices is in the solution of systems of simultaneous equations by either direct or iterative methods. The core operation at the heart of these direct and iterative methods is the multiplication of a sparse matrix by a dense vector to produce a dense result vector. The calculation is of the form y=Ax, where A is a sparse matrix and y and x are dense vectors. The following is an exemplary sparse matrix-vector multiplication.

$$y\begin{bmatrix}0\\1\\2\\3\end{bmatrix}=A\begin{bmatrix}00&01&02&03\\10&11&12&13\\20&21&22&23\\30&31&32&33\end{bmatrix}*x\begin{bmatrix}0\\1\\2\\3\end{bmatrix}$$

The detailed calculations for a 4×4 sparse matrix-vector multiplication performed row-wise is provided by equations 1.

$$y_0 = a_{00}*x_0 + a_{01}*x_1 + a_{02}*x_2 + a_{03}*x_3$$

$$y_1 = a_{10}*x_0 + a_{11}*x_1 + a_{12}*x_2 + a_{13}*x_3$$

$$y_2 = a_{20}*x_0 + a_{21}*x_1 + a_{22}*x_2 + a_{23}*x_3$$

$$y_3 = a_{30}*x_0 + a_{31}*x_1 + a_{32}*x_2 + a_{33}*x_3 \quad \text{Equations 1}$$

In a row-based formulation the elements in the y result vector are computed one row at a time from a row of the A-matrix multiplied by the x vector. In general the form of the multiplication and summation is as shown in equation 2.

$$y[\text{row}] = a[\text{row,col0}]*x[\text{col0}] + a[\text{row,col1}]*x[\text{col1}] + a[\text{row,col2}]*x[\text{col2}] + a[\text{row,col3}]*x[\text{col3}] \quad \text{Equation 2}$$

The steps involved in dense matrix-vector calculations are:
  pre-load x vector into registers within the processor (reused for all y entries).
  initialise y vector.

read A-matrix element-by-element or row-by-row into registers within the processor depending on the width of the data-bus.

multiply a[row, col] by x[col] and sum with y[row].

repeat until all rows/columns have been processed.

In the case of a sparse matrix many of the A.x terms in equation 2 will obviously be zero as many of the columns with in a row of the sparse A-matrix will be zero. Conventional implementations of sparse matrix-vector multipliers have no means of knowing and/or avoiding trivial multiplications where an element of the A-matrix is sparse, resulting in relatively longer run-times and power-dissipation for the overall matrix-vector multiplication.

The present application compresses the sparse-matrix using a bitmap compression. The bitmap designates which matrix elements are zero allowing trivial multiplications to be eliminated and summations of y vector elements from constituent partial-products to be simplified. As the bitmap entries are 1-bit, the multiplication operation reduces to a logical AND.

$$y_0 = bm_{00}*a_{00}*x_0 + bm_{01}*a_{01}*x_1 + bm_{02}*a_{02}*x_2 + bm_{03}*a_{03}*x_3$$

$$y_1 = bm_{04}*a_{10}*x_0 + bm_{05}*a_{11}*x_1 + bm_{05}*a_{12}*x_2 + bm_{07}*a_{13}*x_3$$

$$y_2 = bm_{08}*a_{20}*x_0 + bm_{09}*a_{21}*x_1 + bm_{10}*a_{22}*x_2 + bm_{11}*a_{23}*x_3$$

$$y_3 = bm_{12}*a_{30}*x_0 + bm_{13}*a_{31}*x_1 + bm_{14}*a_{32}*x_2 + bm_{15}*a_{33}*x_3$$

$$bm_n \in \{0,1\} \qquad \text{Equation 3}$$

Based on the bitmap compression the sparse matrix-vector multiplication can be decomposed into the following steps:
1. Pre-load x vector into registers within the processor (reused for all y entries).
2. Initialise y vector.
3. Read in bitmap into internal register from external memory.
4. Expand bitmap into uncompressed schedule for SMVM and store in register.
5. Compress schedule to perform only multiplications using bitmap non-zeroes.
6. Multiply a[row, col] by x[col] and sum with y[row] using compressed schedule.
7. Repeat until all rows/columns have been processed.

Figure 1:
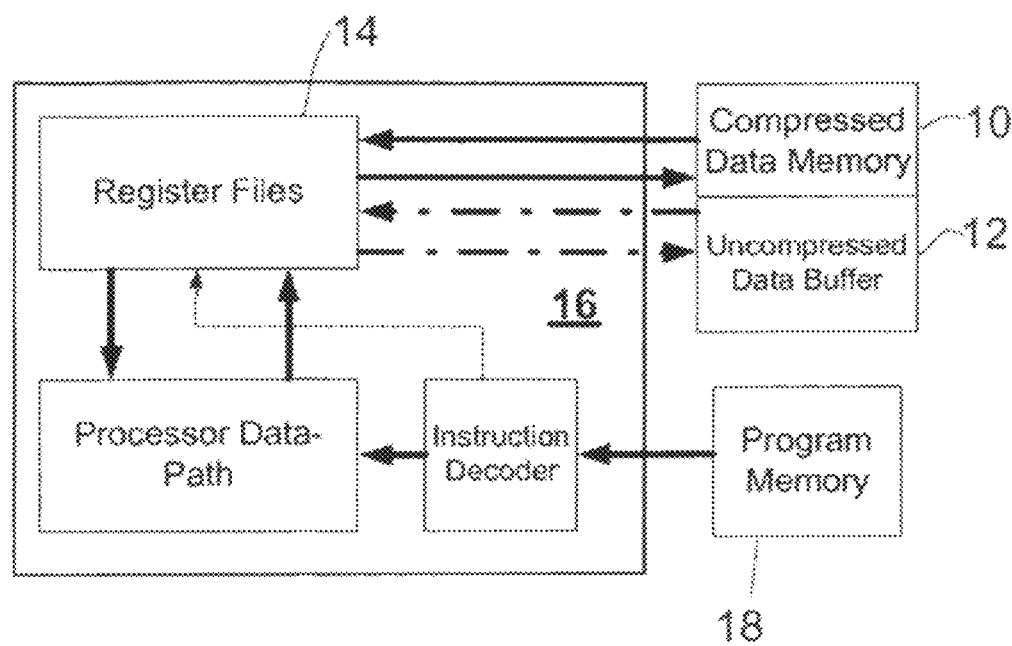
FIG. 1 is a block diagram of a processor arrangement known in the art.
Figure 2:
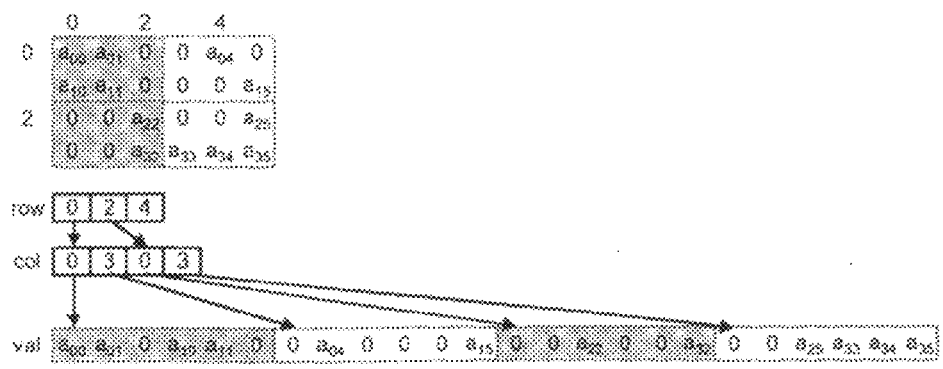
FIG. 2 is an illustration of a block compressed sparse row (BCSR) data structure known in the art.

The hardware 100 is configured to carry out steps 1-7 as listed above. Thus, hardware 100 is operable to perform arithmetic operations such as those listed in equation 3, which is given by way of example only. The hardware 100 is configured to read parameters of a bitmap block compressed sparse row data structure (BBCSR) 112 through a software interface 114. The BBCSR 112 data structure augments the three BCSR arrays of FIG. 2 (row_start, col_idx and value) with a bitmap_idx array containing a bitmap. Each entry in the bitmap denotes whether a zero value is present or not at that position in a tile of the matrix. The value array contents of the BBCSR 112 data structure differs from those in a BCSR data-structure of FIG. 2 in that only the actual non-zero entries are stored without any zero-fill (unless the 1-bit entries in the bitmap are counted) for all of the non-zeroes in the sparse-matrix, arranged in tile-by-tile order. The bitmap entries in the bitmap_idx array of FIG. 5 are hexadecimal values.

The values contained in the four arrays of the BBCSR 112 are written into internal registers 116 of hardware 100 via a mapped memory interface 118 coupled to bus 110. As soon as all the values are loaded computation may be enabled by writing a start code to a command register. The register map for the software interface including the command register is shown in FIG. 6. The command register allows accelerated sparse-matrix vector products (SMVM) to be started, SMVM calculations to be paused, a paused SMVM to be resumed or the hardware 100 to be stopped and all registers reset. All registers may be reset with the exception of the NZ-count which shows the number of A-matrix non-zeroes processed to date by the hardware 100 in the current SMVM, and the cycle-count which shows the number of elapsed cycles in the current SMVM operation. If required additional registers could easily be added to allow a programmer debug SMVM codes by interrogating the contents of the X and Y vector segment and other registers internal to the hardware 100.

The software interface 114 allows the following parameters for a matrix-vector product to be loaded into the registers 116 of the hardware 100 as illustrated in FIG. 3.

BM is the number of bitmap-blocked tiles in an A-matrix 122.

Arows is the number of rows in the A-matrix 122.

Acols is the number of columns in the A-matrix 122.

Anz is the number of non-zero entries in the A-matrix 122.

Brows—is the number of rows in a block tile 124 of the A-matrix 122.

Bcols—is the number of columns in a block tile 124 of the A-matrix 122.

VALaddr is the base address of a value array 126.

RSTaddr is the base address of a row-start array 128.

CIXaddr is the base address of a col_idx array 130.

BIXaddr is the base-address of a bitmap array 132.

A bitmap scheduler 134 reads the bitmap array 132 to generate a schedule 138 of instructions from the bitmap with individual row and column references. An exemplary schedule 138 generated by the bitmap scheduler 134 is illustrated in FIG. 13A. The bitmap scheduler 134 generates a list of non-zero partial-products to be evaluated along with their relative column and row addresses. The schedule also includes a non-zero count to be used by a controller 140. The bitmap schedule 138 is compressed according to a bitmap 142 as illustrated in FIG. 7. The bitmap scheduler 134 may be constructed using multiple bit-slices 146 and an array of multiplexers 144. The scheduling is achieved by controlling a bank of multiplexers 144. In an exemplary embodiment the bitmap scheduler 134 may be constructed from an array of $(N^2+N)/2$, 4-bit by two-input multiplexers where N is the number of bitmap bits and corresponding slots to be scheduled. As can be seen from FIG. 8 the bitmap scheduler 134 consists of 120 by 4-bit, 2:1 multiplexers with associated Look-Up Tables (LUTs). If the bitmap scheduler 134 is included as part of a programmable processor pipeline it can also function as a general purpose 64-bit shifter (in steps of 4 bits or multiples of 4 bits) if an additional 2:1 multiplexer is included at the input to select between LUT outputs and an input register or bus.

Figure 9:
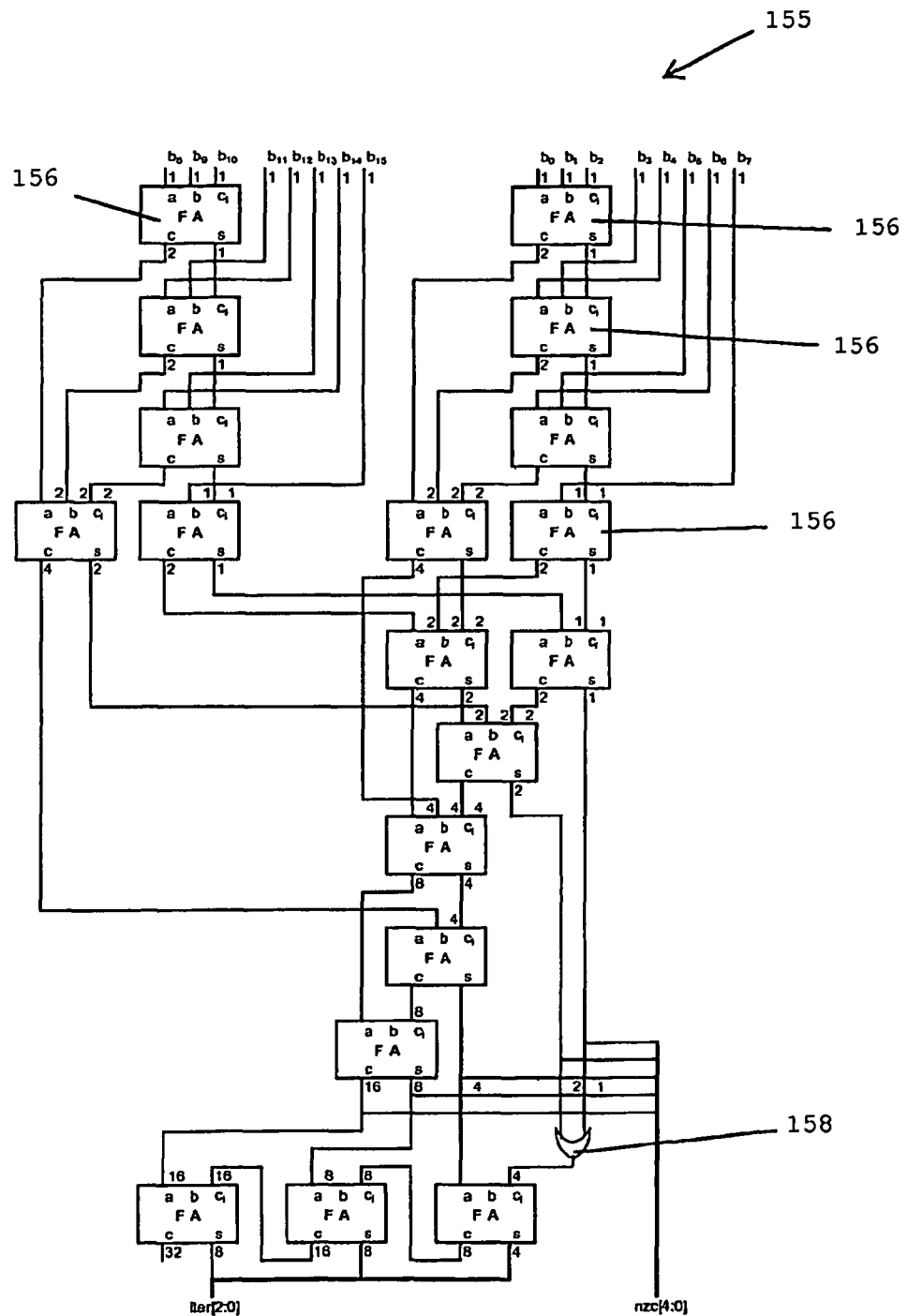
FIG. 9 is a schematic circuit diagram of a component of the hardware of FIG. 3.

The final element of the bitmap scheduler 134 is an iteration-counter 151 which determines the number of arithmetic iterations necessary to perform the SMVM calculations using an N-element wide SIMD FPU. An exemplary embodiment of the iteration-counter 151 is illustrated in FIG. 9 which comprises nineteen full adders 156 and a single OR gate 158.

The controller 140 of the hardware 100 applies all of the relevant control signals along with column and row addresses from the bitmap generated schedule to the multiplexers in order to ensure the correct products are calculated, summed and stored back to the correct y-registers. The control logic signals include signals operable to effect the following operations:
  Load y-vector entries into internal registers corresponding to each row of tiles across the A-matrix (load_y control signal).
  Load bitmap for tile into register (load_bmp).
  Generate schedule from tile bitmap.
  Load x-vector entries into internal registers corresponding to each A-matrix tile (load_x).
  Stream (Read) A-matrix entries from memory (load_a).
  Select the correct x vector entries to be multiplied by each A-matrix entry.
  Evaluate each A.x partial product in sequence (amultx).
  Select the correct y value to be updated by adding the A.x partial-product in a floating point (FP) adder.
  Update the correct y-vector registers.
  Write y-vector register contents back to memory at the end of an A-matrix row.

Figure 12:
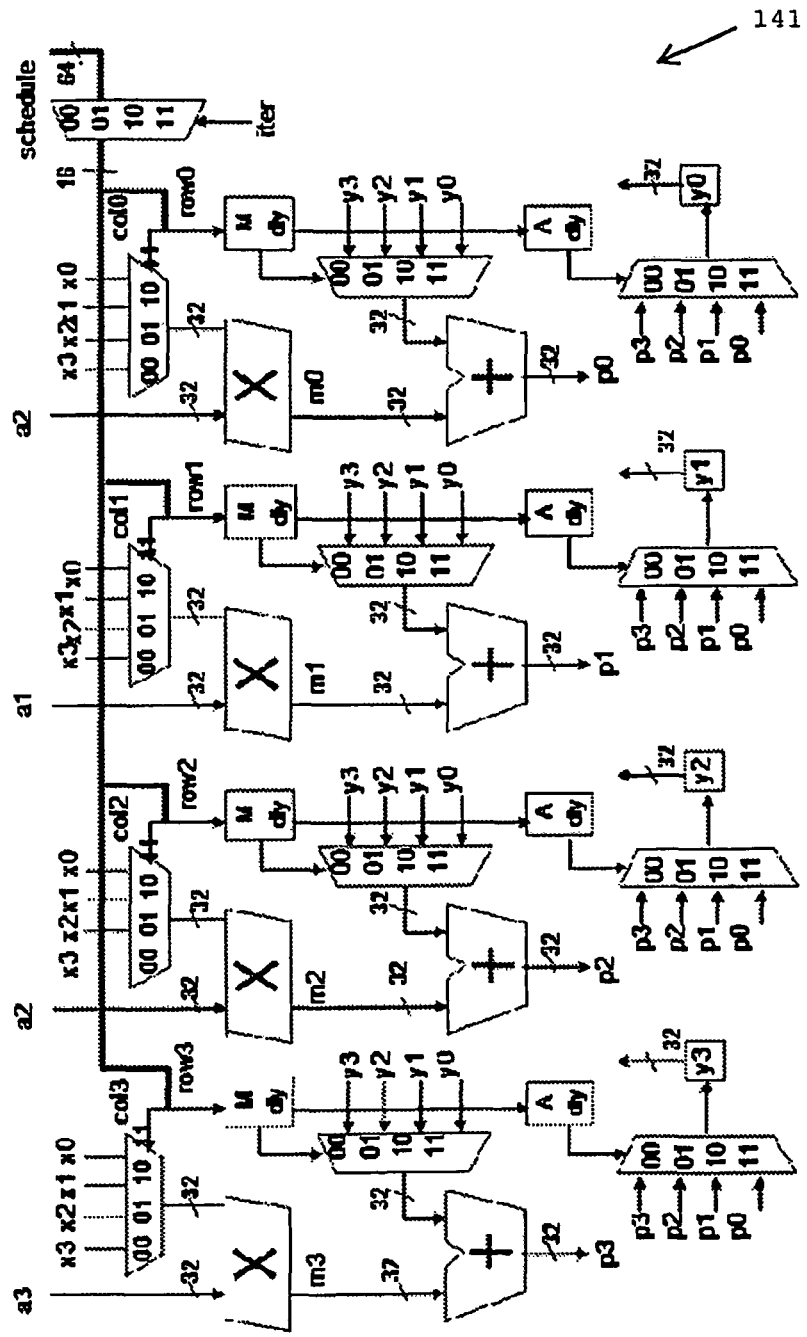
FIG. 12 is a schematic circuit diagram of a component of the hardware of FIG. 3.

The hardware required to perform the arithmetic operations such as multiplication of the non-zero entries in the A-matrix by the appropriate elements is provided by arithmetic circuit 141. In the exemplary embodiment the arithmetic circuit 141 comprises a floating-point unit (FPU). It will be appreciated by those skilled in the art that floating point units typically form part of a computer system and are configured to carry out operations such as multiplication, division, addition, subtraction and square root. The arithmetic circuit 141 may be provided a Single Instruction Multiple Data (SIMD) FPU. An exemplary embodiment of the hardware components which may be contained in arithmetic circuit 141 is illustrated in FIG. 12. In the FIG. 12 A-dly denotes a delay to match the delay in clock-cycles through the floating-point adder, and M-dly denotes a delay to match that through the floating-point multiplier. These delays are required in order to line up the times at which the multiplexer selection signals arrive with the data arriving at the floating-point adder and multiplier.

Figure 10:
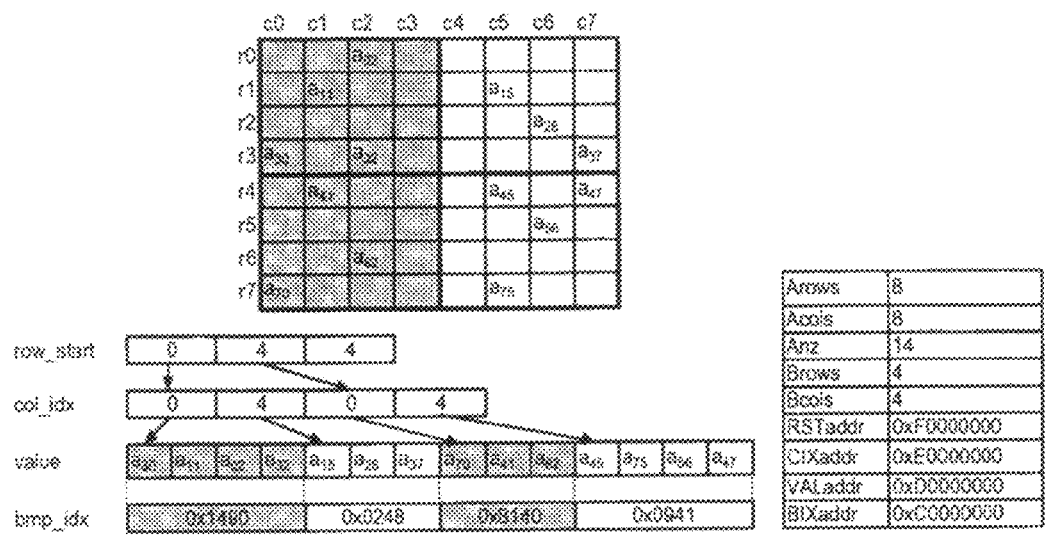
FIG. 10 is an illustration of an exemplary matrix with associated data structures.
Figure 11:
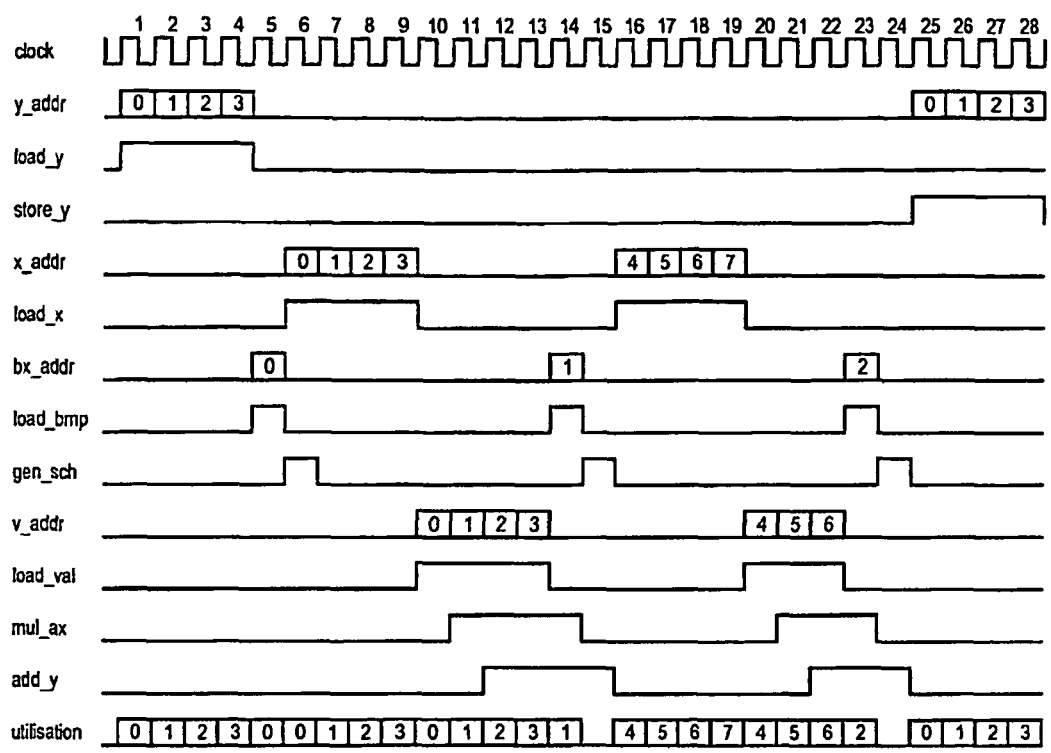
FIG. 11 is a control logic timing diagram illustrating operations performed by the hardware of FIG. 3.

An exemplary embodiment of the hardware 100 in operation will now be described with reference to FIGS. 10 and 11. The segment of the timing diagram shown assumes a 4×4 block tile and single FP multiplier and FP adder, each with single clock-cycle latency, rather than a SIMD unit for simplicity and the period for which the control-signals are shown correspond to the first two tiles and relative bitmaps. The timing-diagram of FIG. 11 is simplified and does not include the datapath source and destination multiplexer control-signals derived from the schedule.

The y-register is initially loaded with four values that hold the first two matrix tiles. Once these values have been loaded the bitmap corresponding to the first matrix tile is fetched, and a schedule is generated. Next the first four x-register values are loaded in the next four clock-cycles. Following this, the first four non-zero A-matrix values are fetched from the value array 126 in memory and multiplied by the x-register entries to produce four partial products. These partial-products are then summed with the four y-vector entries stored in the y-register over four cycles. Next the second tile and associated bitmap are processed updating the y-register values to complete the matrix-vector product. Finally the y-vector values corresponding to the first row of A-matrix tiles are written back to memory from the y-register and the computation of the SMVM product corresponding to the next row of A-matrix tiles can be computed.

The control-logic generated by controller 140 may also contains logic to detect data-dependencies which can lead to RAW hazards and to stall the datapath until these dependencies have been resolved. Equally the controller 140 may halt (pause) the operation of the hardware 100 to wait for data from an external bus, data-cache or indeed external SDRAM.

The control-signals generated by the controller 140 maybe designed to pipeline and to overlap operations which can be carried out simultaneously where possible, resulting in a high bus bandwidth utilisation of 26/28 cycles or 93%. Realistically the bus utilisation which can be achieved will be lower than this once the long latencies of high-frequency floating-point units used in typical processor cores, are considered.

The memory interface 118 is controlled by the controller 140 and increments the four address pointers and generates memory read and write signals in order to ensure all data required by the hardware 100 arrives in a timely manner from the appropriate addresses in memory or cache external to the hardware 100 and that the results generated by the hardware 100 are written back to the correct addresses in memory or cache external to the hardware 100.

The non-zero elements of the A-matrix are multiplied by the corresponding elements of x which are looked up from a register using the column reference from the corresponding schedule entry. The elements of the A-matrix are read from memory directly and multiplied as they enter the hardware 100. There is no requirement to store the elements of the A sparse matrix in the case of sparse-matrix by vector multiplication as the entries in A sparse matrix are only used once.

It will be appreciated by those skilled in the art that not storing the elements of A matrix in a register-file has several advantages compared with the state-of-the-art:
  Power and time (latency) associated with a write of a row of the A matrix to the register-file is saved
  Power and time (latency) associated with a read of a row of the A matrix from the register-file is saved
  Register-pressure associated with temporary storage of A matrix entries in the register-file is avoided It will also be appreciated that storing the x-vector in a temporary register rather than as a multi-ported register file has the advantage that relatively higher power associated with a read of the x vector for each row of the A matrix to be multiplied is saved as a simple temporary register can be used to hold the entries of x.

The bitmap scheduler 134 may be configured to perform look-ahead in order to resolve dependencies. In principle if a schedule can be generated in one clock-cycle and the resultant SMVM takes NZ cycles, the bitmap scheduler 134 can look ahead at the next N bitmaps to evaluate whether data dependencies and associated RAW hazards can be eliminated.

As can be seen in the example shown in FIG. 13 if scheduling is performed independently on a bitmap at a time, dependencies and associated RAW hazards occur in association with the summation of y[1] as each element of row 1 in the tile is non-zero. If this schedule were processed a stall would occur in association with each addition of the partial products to y[1]. The solution depicted in FIG. 13 is to compute the schedules for two bitmaps within the same matrix row dependently, looking ahead so see which slots in the second bitmap schedule can be interleaved with those from the first bitmap schedule in order to remove dependencies. This lookahead scheduling can be extended to further bitmaps on the same basis as shown in order to accommodate floating-point adders with progressively higher latencies which cause proportionately higher stall penalties if not resolved.

It will be understood that what has been described herein is exemplary hardware. While the present application has been described with reference to some exemplary arrangements it will be understood that it is not intended to limit the teaching of the present application to such arrangements as modifications can be made without departing from the spirit and scope of the present invention. It will be appreciated by those skilled in the art that the hardware may be retrofitted into an existing hardware assembly containing hardware components by communicating the hardware with the hardware components of the hardware assembly via a bus. In this way it will be understood that the application is to be limited only insofar as is deemed necessary in the light of the appended claims. Similarly, it will be appreciated that whist the method and hardware have been explained in the context of sparse matrix-vector products, the same method and hardware may also be employed to support dense matrices, vectors as a special case of a matrix with one column or row and matrix-matrix products using arithmetic and logical operations.

Similarly the words comprises/comprising when used in the specification are used to specify the presence of stated features, integers, steps or components but do not preclude the presence or addition of one or more additional features, integers, steps, components or groups thereof.

The invention claimed is:

1. Hardware for performing arithmetic operations on a compressed matrix format stored in memory, the compressed matrix format comprising a bitmap denoting whether individual entries within the matrix are zero or not, the hardware comprising:
a scheduler operable to generate a schedule of instructions from the bitmap denoting whether an entry in the matrix is zero or not, and
an arithmetic circuit configured to perform arithmetic operations on the matrix using non-zero values in accordance with the generated schedule.

2. Hardware according to claim 1, wherein the arithmetic circuit is a Single Instruction Multiple Data (SIMD) floating point unit.

3. Hardware as claimed in claim 1, further comprising a software interface configured for receiving the bitmap.

4. Hardware as claimed in claim 3, wherein the software interface is operable to read the number of bitmap-blocked tiles in the matrix.

5. Hardware as claimed in claim 3, wherein the software interface is operable to read the number of rows in the matrix.

6. Hardware as claimed in claim 5, wherein the software interface is operable to read the number of columns in the matrix.

7. Hardware as claimed in claim 3, wherein the software interface is operable to read the number of non-zero entries in the matrix.

8. Hardware as claimed in claim 3, wherein the software interface is operable to read the number of rows in a block tile of the matrix.

9. Hardware as claimed in claim 3, wherein the software interface is operable to read the number of columns in a block tile of the matrix.

10. Hardware as claimed in claim 3, wherein the software interface is operable to read a base address of a first array containing the nonzero data elements of the matrix.

11. Hardware as claimed in claim 10, wherein the software interface is operable to read a base address of a second array which holds the row entries containing non-zero tiles.

12. Hardware as claimed in claim 11, wherein the software interface is operable to read a base address of a third array which contains the column addresses of the non-zero tiles.

13. Hardware as claimed in claim 12, wherein the software interface is operable to read a base address of a fourth array which holds the bitmap.

14. Hardware as claimed in claim 13, wherein the first, second, third and fourth arrays are stored in external memory.

15. Hardware as claimed in claim 3, further comprising registers for storing data received via the software interface.

16. Hardware as claimed in claim 15, further comprising a mapped memory interface for facilitating writing data received through the software interface into the registers.

17. Hardware as claimed in claim 16, where the registers store a memory map.

18. Hardware as claimed in claim 15, wherein the registers store commands for implementing sparse-matrix vector products (SMVM).

19. Hardware as claimed in claim 18, wherein the commands includes a command to initiate SMVM.

20. Hardware as claimed in claim 18, wherein the commands includes a command to pause an SMVM calculation.

21. Hardware as claimed in claim 20, wherein the commands includes a command to cause a paused SMVM calculation to be resumed.

22. Hardware as claimed in claim 20, wherein the commands includes a command to cause a paused SMVM calculation to be terminated.

23. Hardware as claimed in claim 18, wherein the commands includes a command to reset registers.

24. Hardware as claimed in claim 18, wherein the commands includes a stop command.

25. Hardware as claimed in claim 1, wherein the scheduler is configured to generates a list of non-zero partial-products to be evaluated along with the relative column and row addresses derived from the bitmap.

26. Hardware as claimed in claim 25, wherein the schedule generated by the scheduler is compressed according to a bitmap.

27. Hardware as claimed in claim 1, wherein the scheduler comprises an array of multiplexers.

28. Hardware as claimed in claim 1, wherein the scheduler comprises multiple bit-slices.

29. Hardware as claimed in claim 28, wherein the multiplexers have associated Look-Up Tables (LUTs).

30. Hardware as claimed in claim 1, wherein the scheduler forms part of a programmable processor.

31. Hardware as claimed in claim 1, wherein the scheduler further comprises an iteration-counter operable to determine the number of arithmetic iterations required.

32. Hardware as claimed in claim 31, wherein the iteration-counter comprises a plurality of full adders.

33. Hardware as claimed in claim 32, wherein the iteration-counter further comprises an OR gate.

34. Hardware as claimed in claim 1, further comprising a controller configured for generating control signals.

35. Hardware as claimed in claim 34, wherein the controller is configured for applying the control signals to the arithmetic circuit for controlling arithmetic operations.

36. Hardware as claimed in claim 35, wherein the controls signals include a signal for loading y-vector entries.

37. Hardware as claimed in claim 35, wherein the control signals includes a signal for loading a bitmap.

38. Hardware as claimed in claim 35, wherein the control signals includes a signal for generating a schedule.

39. Hardware as claimed in claim 35, wherein the control signals includes a signal for loading x-vector entries.

40. Hardware as claimed in claim 39, wherein the control signals includes a signal for reading matrix entries from memory.

41. Hardware as claimed in claim 40, wherein the control signals includes a signal for selecting the correct x vector entries to be multiplied by each matrix entry.

42. Hardware as claimed in claim 41, wherein the control signals include a signal for evaluating a partial product.

43. Hardware as claimed in claim 42, wherein the control signals include a signal for evaluating arithmetic.

44. Hardware as claimed in claim 42, wherein the control signals include a signal for selecting the correct y value to be updated.

45. Hardware as claimed in claim 44, wherein the control signals include a signal for writing contents to external memory.

46. Hardware as claimed in claim 35, wherein the controller is configured for detecting data-dependencies which can lead to data hazards.

47. Hardware as claimed in claim 46, wherein the controller is configured to stall a datapath until the data-dependencies have been resolved.

48. Hardware as claimed in claim 35, wherein the controller is operable to pause an operation in order to wait for data from an external bus, data-cache or external SDRAM.

49. Hardware as claimed in claim 1, wherein the scheduler is configured to perform look-ahead in order to resolve dependencies.

50. Hardware as claimed in claim 28, wherein the row and column address look-up tables (LUTs) used by the scheduler to generate addresses used in the schedule are programmable.

51. Hardware as claimed in claim 1, wherein the number of rows and columns decoded from the bitmap are programmable.

52. Hardware as claimed in claim 1, where the bitmap can be used to generate a list of logical and/or arithmetic instructions and array references for operations other than sparse-matrix vector products.

53. A hardware assembly comprising the hardware as claimed in claim 1.

54. A hardware assembly as claimed in claim 53, further comprising a processor.

55. A hardware assembly as claimed in claim 53, further comprising a cache.

56. A hardware assembly as claimed in claim 53, further comprising an SDRAM controller.

57. A hardware assembly as claimed in claim 53, further comprising SDRAM.

58. A hardware assembly as claimed in claim 1, further comprising a bus for communication the hardware with other hardware components.

59. A method of retrofitting hardware as claimed in claim 1 into an existing hardware assembly, the method comprising:
  communicating the hardware with the hardware assembly via a bus.

60. A method of constructing a hardware assembly, the method comprising:
  communicating the hardware as claimed in claim 1 with at least one other hardware component via a bus.

* * * * *